(No Model.) 2 Sheets—Sheet 1.
W. T. HILL.
SPORTING TRAP.
No. 428,489. Patented May 20, 1890.
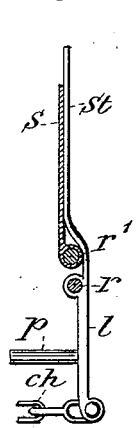
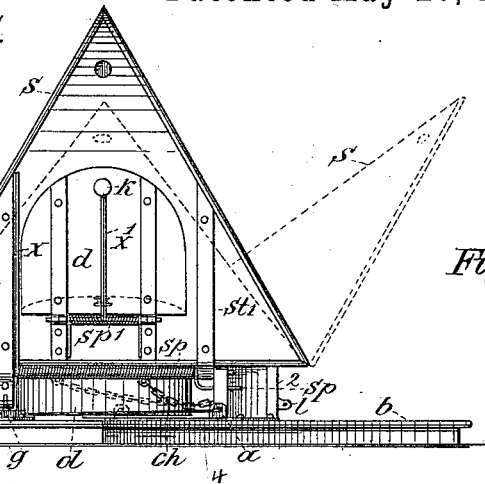
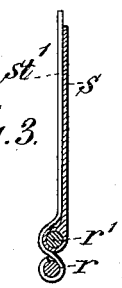
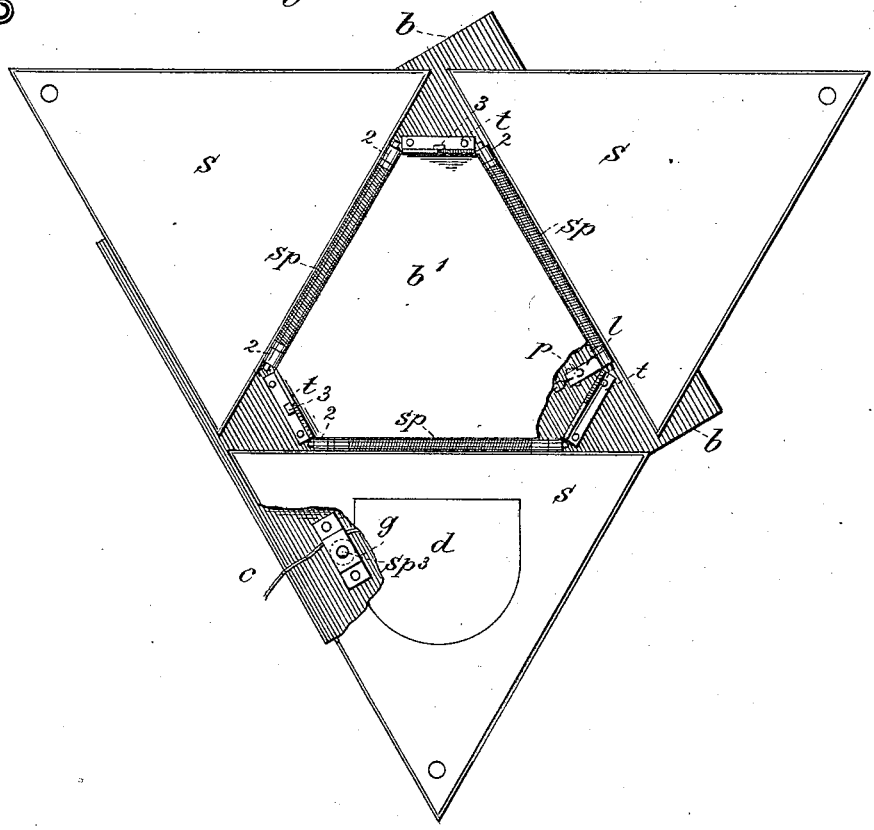
WITNESSES.
Gustav Bohn.
E. B. Griffith.
INVENTOR.
William T. Hill.
By C. F. Jacobs
atty.

(No Model.) 2 Sheets—Sheet 2.

W. T. HILL.
SPORTING TRAP.

No. 428,489. Patented May 20, 1890.

WITNESSES.
Gustav Bohn.
E. B. Griffith.

INVENTOR.
William T. Hill.
By C. P. Jacobs
Atty.

UNITED STATES PATENT OFFICE.

WILLIAM T. HILL, OF INDIANAPOLIS, INDIANA.

SPORTING-TRAP.

SPECIFICATION forming part of Letters Patent No. 428,489, dated May 20, 1890.

Application filed September 9, 1889. Serial No. 323,466. (No model.)

*To all whom it may concern:*

Be it known that I, WILLIAM T. HILL, of Indianapolis, county of Marion, and State of Indiana, have invented certain new and useful Improvements in Ground-Traps; and I do hereby declare that the following is a full, clear, and exact description thereof, reference being had to the accompanying drawings, in which like letters refer to like parts.

My invention relates to the construction of devices known as "ground-traps," from which birds may be released at a signal for marksmen, and will be understood from the following description.

Figure 5:
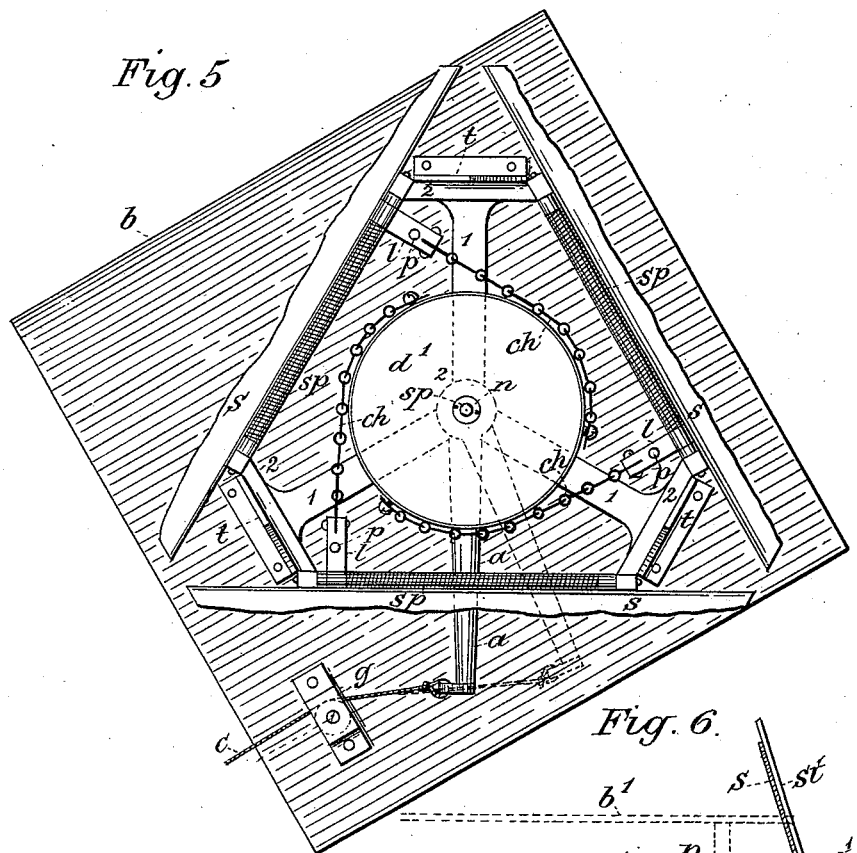
Figure 6:
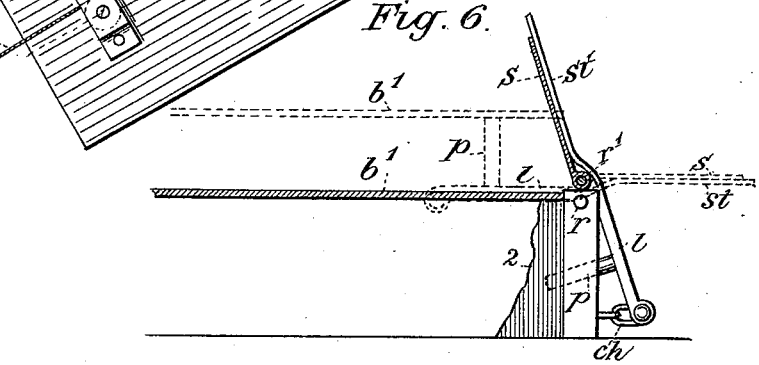
Figure 7:
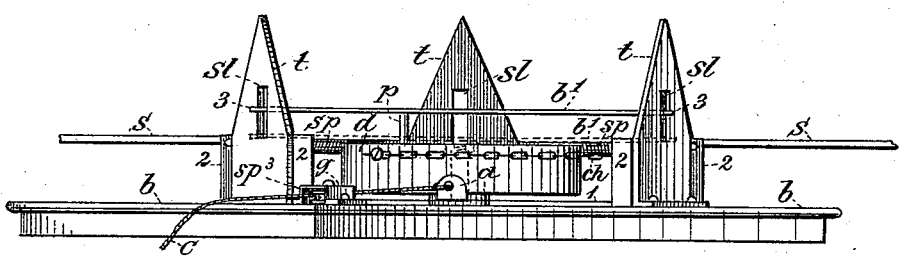

In the drawings, Figure 1 is a side view of my device closed, the dotted lines showing the position of the sides when partly open. Fig. 2 is an edge view of one of the strips and the lug to which the chain is connected. Fig. 3 is a similar view of one of the hinging strips and side. Fig. 4 is a top view of the trap open, partly broken away, showing the position of the lugs and pin and the guide-pulley. Fig. 5 is a detail view of the mechanism that operates the sides of the trap, the sides themselves being broken off. Fig. 6 is an edge view of the movable bottom and the mechanism that lifts it, the dotted lines indicating the position of the parts when raised. Fig. 7 is a detail side view of Fig. 5, the last three views being on a larger scale than the others.

In detail the trap is constructed as follows:

$b$ is a square base, on which is secured a frame-work composed of spider-arms 1 and the cross-arms 2, from the latter of which project upward triangular pieces $t$, having central slots $sl$ part of their height, as shown in Fig. 7.

$d'$ is a disk mounted on the spindle $sp$, whose lower end has bearings in the base and upper end in the frame-work, and secured at the top by a nut $n$, which has notches on each side, so that it may be turned with a wrench or screw-driver. This disk revolves with its spindle, and has a projecting arm $a$ connected therewith, to which is attached the operating-cord $c$, passing through a guide-pulley $g$ and out a suitable distance from the trap. To the periphery of the disks are secured the ends of a chain $ch$, its opposite end being connected to the lug $l$, formed integral with a metal strip $st$, which is fastened above the bottom to the side $s$, as shown in Fig. 6. This lug $l$ has a pin $p$ connected to its inner side, normally standing in the position shown in Fig. 6. The chains connecting the lugs to the periphery of the disk are of such length as to prevent any lost motion or unnecessary rattling of parts, and when the disk is rotated by pulling the cord $c$ the lugs $l$ are drawn inward, and the sides $s$, which are connected to the strips $st$, which are practically integral with the lug, are thrown outward, the pin $p$ is brought up beneath the movable bottom $b'$, which rests upon the frame-work and covers the disk $d'$, and this bottom is lifted by means of these pins about an inch, as shown in Fig. 6, so that as the trap is fully opened the movable bottom $b'$ is thrown above its normal position the distance indicated. Below each of these sides is a rod $r$, journaled in bearings in the cross-piece 2 of the frame, and about this rod is coiled a wire spring $sp$, one end of which passes through the base of the frame, as shown at 4 in Fig. 1, and the other end is extended, as at $x$, passing up along the side $s$ and bearing against it its entire length. The normal operation of this spring is therefore to keep the sides closed together in the manner shown in Fig. 1, and the pull upon the cord $c$ operates against the tension of this spring to open the trap, so that when the string is released the tension of the spring will close the sides together, shutting it up.

The movable bottom $b'$ is shown elevated in Fig. 7 and resting upon the pin $p$. This bottom has tongues or guides 3 at each corner which pass through the slots $sl$, formed in the triangular pieces $t$, and these guides have a loose fit, and the bottom will fall easily and uniformly on all points, its own weight causing it to descend. It is obvious, however, that its descent might be regulated by a small coiled spring in the same manner as the sides; but this would be a mere mechanical equivalent of the construction herein shown. The object of this movable bottom will be better understood as I now proceed to describe the operation of the device. The trap, being placed upon the ground at the proper point, is fastened so as to be immovable, the bird being shut in the trap. At the proper signal the operator pulls on the cord c, drawing the arm a toward the guide-pulley g and rotating the disk d', to which this arm is connected. This operates through the chain ch to pull the lug l inward and to draw the pin p upward against the bottom b', and at the same time to throw the sides over and outward until they are flat, and at the same time to raise the bottom b' about an inch. If the bird is not flushed by the opening of the trap, and does not rise instantly, as sometimes happens, the operator will flush him by slightly releasing his pull upon the cord c, and this will allow the bottom b' to drop, taking it practically from beneath the feet of the bird, and he supports himself by poising his wings and taking flight. Of course if one movement should not be sufficient a second or third pull upon and releasing of the cord will always accomplish it. As the cord is released, the bottom b' falls to its normal position and the sides close together, the triangular piece t serving as a backing against which the sides rest when closed.

d is a door formed in one of the sides, through which the bird is put into the trap, and this door is hung upon a rod, about which a small wire spring sp' is coiled, the two ends meeting in the center and passing over the knob k of the door. The tension of this spring normally keeps the door closed, and by pulling on the knob k the door is opened against such tension, and when the pressure is released the spring will close the door automatically.

The advantages of my trap are these: First, it is triangular in shape, and the sides when closed together fit in such manner as to close the trap and dispense entirely with a top piece, and, second, the coiled spring normally keeps the trap closed and the pulling of the cords c opens them as against the pressure of such spring, and when the trap is opened it is not collapsed, but the sides are simply thrown down out of the way, and are ready to spring up and close together without any effort on the part of the operator, except to release his hold upon the cord. Further, the trap, being of this peculiar shape, opens freely in the line of vision of the marksman, and he sees the bird much better than from a rectangular-shaped trap collapsed in the usual manner, and the bird when he rises will always fly quartering, owing to the shape of the trap, and this angle is the best for the marksman. Again, the movement of all parts is automatic, and the movable bottom is lifted by the same mechanism that opens, and is dropped by practically the same mechanism that closes the trap.

It is obvious that other mechanism which would be equivalent might be used and modifications might be made without departing from the principle of my invention, and I do not limit myself to the mere construction herein shown.

I am aware that collapsible traps have been made; but they are not automatic in operation nor triangular in construction, and they are made in a different manner and operate on a different principle from mine.

What I claim as my invention, and desire to secure by Letters Patent, is the following:

1. A ground-trap composed of three triangular sides connected to a frame-work mounted on a suitable base, and spring mechanism connected to such sides, whose tension normally closes the same together, in combination with a rotating disk mechanism located beneath the bottom, connected to the sides by cords or chains for opening the trap, substantially as shown and described.

2. A ground-trap composed of three triangular sides closed by spring mechanism, and a disk mounted upon a spindle beneath the bottom, having bearings in the base and frame and connected by cords or chains to each of the sides thereof, whereby the revolution of the disk in one direction operates to open the trap, and a spring mechanism connected to the sides tends to close the same when the pressure is released, substantially as shown and described.

3. A ground-trap comprising three triangular sides supported upon a frame-work resting upon a base, spring mechanism connected to such sides for closing the same together, and a disk mounted upon a spindle having bearings in the base and frame-work, whereby the revolution of the disk against the tension of the spring operates to open such trap, and releasing the pressure upon the spring closes the trap, in combination with a door in one side of such trap and a movable bottom resting upon the frame-work, substantially as shown and described.

4. A ground-trap whose sides are closed by spring mechanism and opened by the revolution of a circular disk connected to the sides of and located beneath such trap, such disk mounted on a spindle having bearings in the frame-work, and a movable bottom resting on such frame-work lifted by the same mechanism that opens the trap and falling as the trap closes, substantially as described.

5. A ground-trap comprising three triangular sides hinged to a frame-work, a spring mechanism connected to the sides, whereby the tension of the spring operates normally to close them together, a disk mechanism having connection with each of the sides of the trap revoluble upon suitable bearings, with means for revolving such disk and opening the trap against the tension of the spring, and a movable bottom resting upon such frame-work, and pins connected with the sides, which operate to lift such bottom when the sides are opened, substantially as shown and described.

6. A ground-trap formed of three triangular sides normally held closed by springs connected therewith located beneath such trap, mechanism for opening the same connected to and actuating all the sides simultaneously, and a movable bottom which is lifted by the opening and dropped by the closing of the trap through the rotation of such disk, all combined substantially as described.

In witness whereof I have hereunto set my hand this 24th day of August, 1889.

WILLIAM T. HILL.

Witnesses:
C. P. JACOBS,
E. B. GRIFFITH.